(12) United States Patent
Haim

(10) Patent No.: US 6,980,538 B2
(45) Date of Patent: *Dec. 27, 2005

(54) VIRTUAL LOCATING OF A FIXED SUBSCRIBER UNIT TO REDUCE REACQUISITION TIME

(75) Inventor: John W. Haim, Baldwin, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 973 days.

This patent is subject to a terminal disclaimer.

(21) Appl. No.: 09/880,977

(22) Filed: Jun. 14, 2001

(65) Prior Publication Data

US 2001/0026540 A1    Oct. 4, 2001

Related U.S. Application Data

(63) Continuation of application No. 09/304,286, filed on May 3, 1999, now Pat. No. 6,252,866, which is a continuation of application No. 08/671,068, filed on Jun. 27, 1996, now Pat. No. 5,940,382.

(51) Int. Cl.$^7$ .............................................. H04H 1/00
(52) U.S. Cl. ..................................................... 370/339
(58) Field of Search ............................... 370/335, 310, 370/311, 312, 314, 320, 331, 332, 333, 337, 370/341, 345, 347, 351, 350, 318, 317, 319, 370/321, 324, 344, 343, 503, 441, 442, 519, 370/518, 517, 515, 512, 504–508, 479, 480; 455/503, 38.3

(56) References Cited

U.S. PATENT DOCUMENTS 4,811,421 A    3/1989  Havel et al.

| | | |
|---|---|---|
| 5,022,049 A | 6/1991 | Abrahamson et al. |
| 5,056,109 A | 10/1991 | Gilhousen et al. |
| 5,113,525 A | 5/1992 | Andoh |
| 5,159,283 A | 10/1992 | Jensen |
| 5,235,614 A | 8/1993 | Bruckert et al. |
| 5,257,283 A | 10/1993 | Gilhousen et al. |
| 5,265,119 A | 11/1993 | Gilhousen et al. |
| 5,267,262 A | 11/1993 | Wheatley, III |

(Continued)

FOREIGN PATENT DOCUMENTS

EP    0565507    10/1993

OTHER PUBLICATIONS

Patent Abstracts of Japan, vol. 015, No. 003 (E-1019), Jan. 7, 1991 & JP 02 256331 A (Sharp Corp.), Oct. 17, 1990, see abstract.

*Primary Examiner*—Dang Ton
(74) *Attorney, Agent, or Firm*—Volpe and Koenig, P.C.

(57) ABSTRACT

A system and method reduces the time required by a base station to acquire a fixed subscriber unit in a CDMA communication system by virtually locating of the subscriber units. A base station acquires subscriber units by searching only those code phases concomitant with the largest propagation delay possible in the cell, as if all subscriber units were located at the periphery of the cell. A subscriber unit which has never been acquired by the base station varies the delay between the PN code phase of its received and transmitted signals over the range of possible delays in a cell and slowly ramps-up its transmission power until it is acquired by the base station. Upon initial acquisition by the base station, the subscriber unit ceases ramping-up its transmission power, ceases varying the delay and internally stores the final value of the delay in memory.

19 Claims, 12 Drawing Sheets

U.S. PATENT DOCUMENTS

| | | |
|---|---|---|
| 5,297,162 A | 3/1994 | Lee et al. |
| 5,309,474 A | 5/1994 | Gilhousen et al. |
| 5,327,455 A | 7/1994 | De Gaudenzi et al. |
| 5,353,302 A | 10/1994 | Bi |
| 5,353,352 A | 10/1994 | Dent et al. |
| 5,363,377 A | 11/1994 | Sharpe |
| 5,377,183 A | 12/1994 | Dent |
| 5,406,559 A | 4/1995 | Edem et al. |
| 5,414,728 A | 5/1995 | Zehavi |
| 5,430,760 A | 7/1995 | Dent |
| 5,442,662 A | 8/1995 | Fukasawa et al. |
| 5,446,756 A | 8/1995 | Mallinckrodt |
| 5,619,524 A | 4/1997 | Ling et al. |
| 5,745,484 A | 4/1998 | Scott |
| 5,940,382 A * | 8/1999 | Haim .................... 370/335 |
| 6,252,866 B1 * | 6/2001 | Haim .................... 370/335 |

* cited by examiner

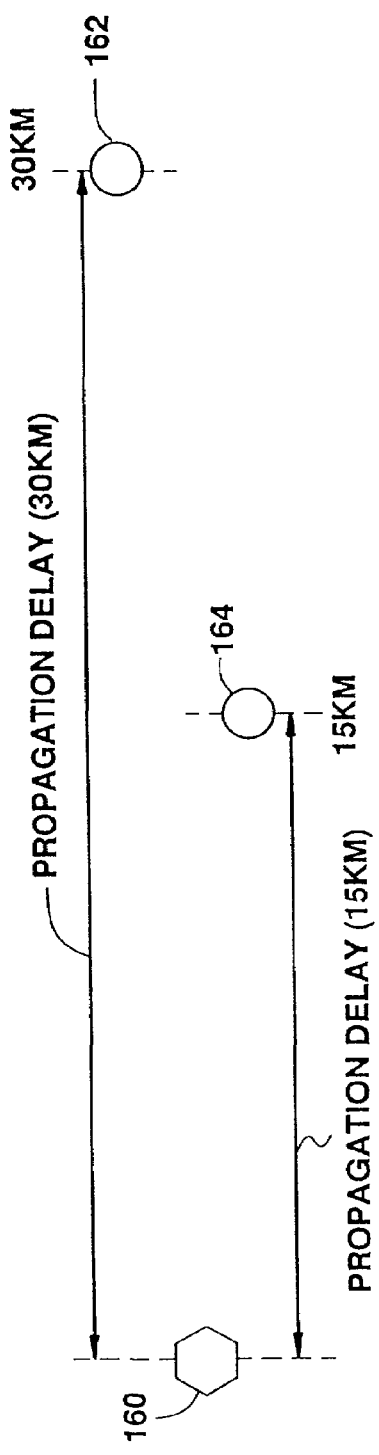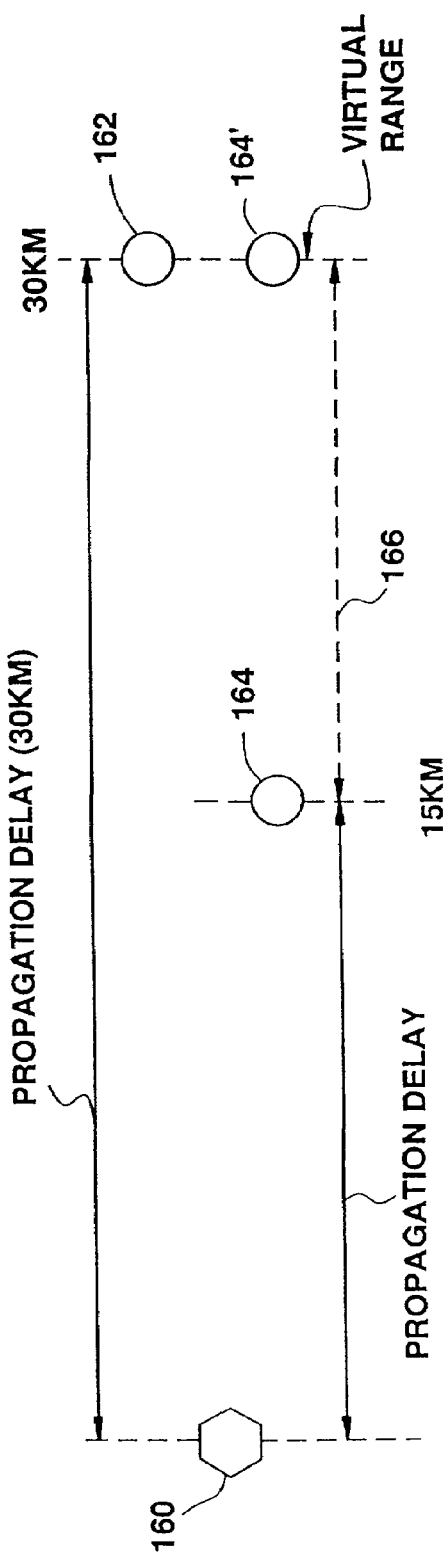

VIRTUAL LOCATING OF A FIXED SUBSCRIBER UNIT TO REDUCE REACQUISITION TIME

CROSS REFERENCE TO RELATED APPLICATIONS

This application is a continuation of application Ser. No. 09/304,286, filed on May 3, 1999, which issued on Jun. 26, 2001 as U.S. Pat. No. 6,252,866; which is a continuation of application Ser. No. 08/671,068, filed on Jun. 27, 1996, which issued on Aug. 30, 1999 as U.S. Pat. No. 5,940,382.

BACKGROUND OF THE INVENTION

1. Field of the Invention

The present invention relates generally to code division multiple access (CDMA) communication systems. More particularly, the present invention relates to a CDMA communication system which utilizes virtual locating of a fixed subscriber unit to reduce the time for a base station to detect an access signal from a subscriber unit and establish a communication channel between the base station and the subscriber unit.

2. Description of Related Art

Most widely used conventional telecommunication systems require transmissions to be confined to a separate frequency or time slot. Systems using frequency division multiple access (FDMA) assign each user a specific portion of the frequency spectrum for communication. Systems using time division multiple access (TDMA) assign each user a repeating time slot to transmit the desired information. These conventional techniques require strict definition of time slots, channels and guardbands between channels in order to prevent communicating nodes from interfering with one another.

Channelization and guardband requirements have resulted in a tremendous inefficiency in the use of the RF spectrum. As the number of commercial applications of wireless technology increases, the need for communication systems which utilize the RF spectrum more efficiently has become paramount.

CDMA communication systems have had a long history of use in military applications. CDMA permits communications which are difficult to detect by enemies and offer robust communications during attempts by enemies to jam communications. In CDMA communications, each signal or communication channel is distinguished from all others in a particular frequency band by a unique pseudo noise (PN) code imprinted upon data transmitted by the transmitter. A receiver which is privy to the unique code uses the code to resolve the desired data signal channel from among many the simultaneous data signals and channels in the frequency band.

The features that have enabled CDMA communication systems to succeed in military applications also make CDMA communication systems well adapted for efficiently utilizing the RF spectrum. Since each subscriber unit in a CDMA communication system transmits and receives resolvable communication signals over the same frequency band, there are less stringent channelization and guardband requirements. Accordingly, the capacity of the system (the number of users able to communicate simultaneously) is significantly increased.

Although use of the same portion of the RF spectrum by a plurality of subscriber units increases system efficiency, each subscriber unit receives communication signals that do not have its unique code as interference. The more power that is utilized by a single subscriber unit to communicate with the base station, the more interference is presented to other subscriber units. The power from one subscriber unit may even terminate other communications if it becomes too high. Accordingly, the control of the transmission power of all subscriber units is important to maintain high quality communications throughout the system.

A typical CDMA communication system is shown in FIG. 1. The system comprises a cell base station (B), and a plurality of fixed subscriber units S1–S7 located at various distances from the base station. The base station constantly transmits a forward pilot signal. The subscriber units maintain epoch alignment between the forward pilot signal and their internal PN code generator such that all signals transmitted from the subscriber unit are at the same PN code phase at which the forward pilot is received. The base station receives signals from subscriber units with a code phase difference between its forward pilot signal and the received signal corresponding to the two-way signal propagation delay between the base station and the subscriber.

For the base station to detect a signal, it must align the phase of its receive PN code generator to the phase of the received signal, thus "acquiring" the signal. The base station can receive an access signal with any code phase difference within the range of the cell. Therefore, the base station must test all code phases associated with the range of possible propagation delays of the cell to acquire the access signal.

Once a communication channel is established between the base station and the subscriber unit, the transmission power of the subscriber unit is controlled by a closed loop automatic power control (APC) algorithm which prevents the power from each subscriber unit from excessively interfering with other subscriber units. During channel establishment, before the closed loop power control begins, the subscriber unit's transmission power is kept to a minimum by ramping-up from a low level and establishing the channel without the subscriber unit significantly overshooting (on the order of less than 3 dB) the minimum power necessary to operate the channel.

To establish a channel, each subscriber unit transmits a PN coded access signal for detection by the base station. The base station acquires the access signal and transmits a confirmation signal to each subscriber unit. The time required for the base station to acquire the access signal contributes directly to the time elapsed between a subscriber unit going "off-hook", establishing a communication channel, connecting to the public switched telephone network (PSTN) and receiving a dial tone. It is desirable to receive a dial tone within 150 msec of detection of "off-hook".

The time distribution of acquisition opportunities is shown in FIG. 2 for a typical subscriber unit located 20 km from a base station in a 30 km cell. For a base station which tests 8 code phases simultaneously at a PN rate of 12.48 MHz and a symbol rate of 64,000 symbols per second, and takes an average of 7.5 symbol periods to accept or reject a particular group of code phases, the average time to test all code phase delays within the cell is approximately 37 msec, and any one subscriber unit can only be detected during an approximately 100 $\mu$sec window during that period. Assuming that the selection of initial subscriber unit transmission power level is 15–20 dB below the proper level and a slow ramp-up rate of between 0.05 and 0.1 dB/msec, it could take 4–5 such 37 msec time periods, (or an average of approximately 200 msec,) for the base station to acquire a subscriber unit. This introduces an unacceptable delay in the channel establishment process which should be less than 150 msec.

Accordingly, there is a need to reduce the amount of time required for a base station to acquire a subscriber unit.

SUMMARY OF THE INVENTION

The present invention comprises a method of reducing the re-acquisition time of a fixed subscriber unit by a base station in a CDMA communication system by utilizing virtual locating of the subscriber unit. A base station acquires subscriber units by searching only those code phases concomitant with the largest propagation delay possible in the cell, as if all subscriber units were located at the periphery of the cell. A subscriber unit which has never been acquired by the base station varies the delay between the PN code phase of its received and transmitted signals over the range of possible delays in a cell and slowly ramps-up its transmission power until it is acquired by the base station. Upon initial acquisition by the base station the subscriber unit ceases ramping-up its power and varying the delay and internally stores the final value of the delay in memory. For subsequent re-acquisition, the subscriber unit adds the delay value between the PN code phase of its received and transmitted signals, making the subscriber virtually appear to be at the periphery of the cell. This permits a quick ramp-up of transmission power by the subscriber unit and reduced acquisition time by the base station.

Accordingly, it is an object of the present invention to provide an improved method and system for decreasing the reacquisition time of a fixed subscriber unit by a base station in a CDMA communication system.

Other objects and advantages of the present invention will become apparent after reading the description of a presently preferred embodiment.

BRIEF DESCRIPTION OF THE DRAWINGS

FIG. 7A is a diagram of the communications between a base station and a plurality of subscriber units;

FIG. 7B is a diagram of the base station and a subscriber unit which has been virtually located;

DETAILED DESCRIPTION OF THE PREFERRED EMBODIMENT

Figure 1:
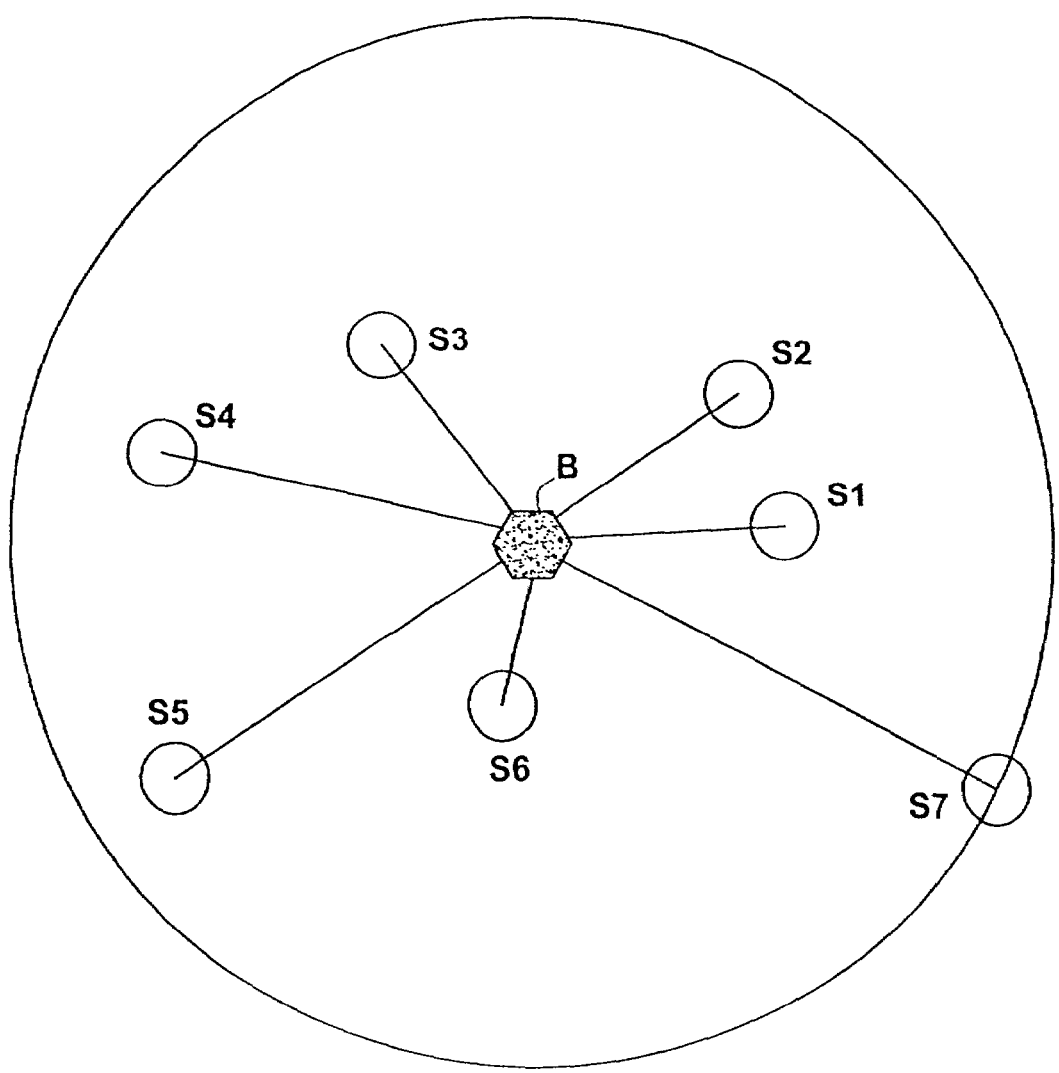
FIG. 1 is a prior art CDMA communication system.
Figure 2:
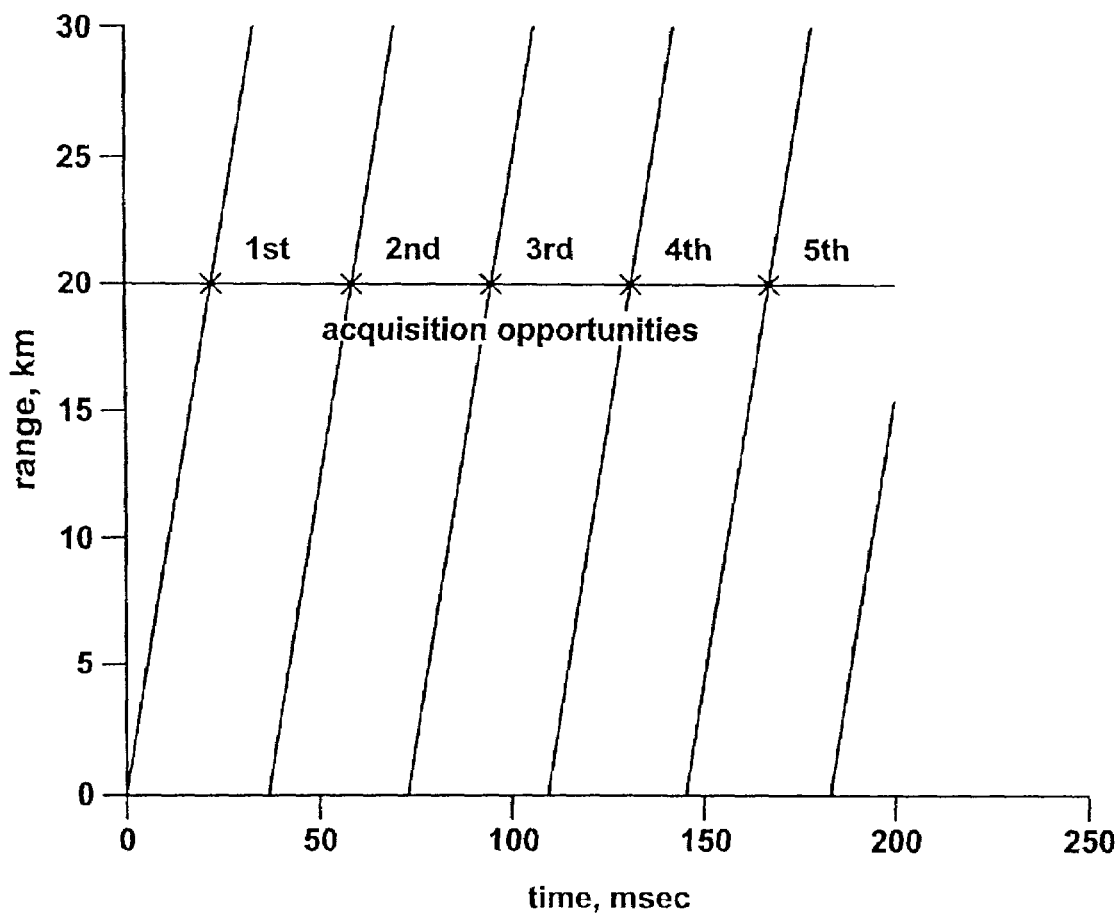
FIG. 2 is a graph of the distribution of acquisition opportunities of the system of FIG. 1.

The preferred embodiment will be described with reference to the drawing figures where identical numerals represent similar elements throughout.

Figure 3:
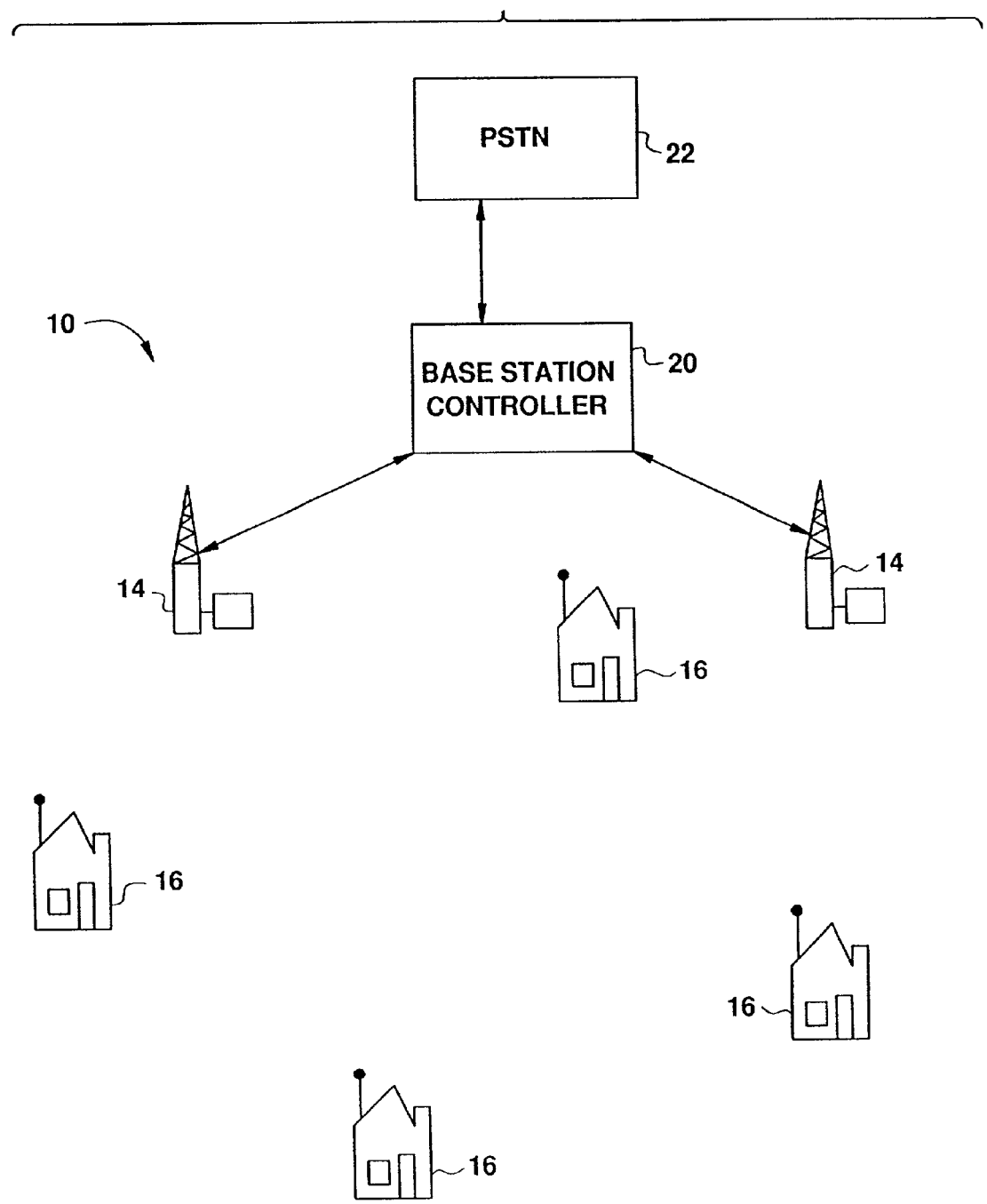
FIG. 3 is a schematic overview of a CDMA communication system in accordance with the present invention.

A communication network 10 embodying the present invention is shown in FIG. 3. The communication network 10 generally comprises one or more base stations 14, each of which is in wireless communication with a plurality of fixed subscriber units 16. Each subscriber unit 16 communicates with either the closest base station 14 or the base station 14 which provides the strongest communication signal. The base stations 14 also communicate with a base station controller 20, which coordinates communications among base stations 14 and between base stations 14. The communication network may also be connected to a public switched telephone network (PSTN) 22, whereupon the base station controller 20 also coordinates communication between the base stations 14 and the PSTN 22. Preferably, each base station 14 communicates with the base station controller 20 over a wireless link, although a land line may also be provided. A land line is particularly applicable when a base station 14 is in close proximity to the base station controller 20.

The base station controller 20 performs several functions. Primarily, the base station controller 20 provides all of the overhead, administrative and maintenance (OA&M) signaling associated with establishing and maintaining all of the wireless communications between the subscriber units 16, the base stations 14, and the base station controller 20. The base station controller 20 also provides an interface between the wireless communication system 10 and the PSTN 22. This interface includes multiplexing and demultiplexing of the communication signals that enter and leave the system 10 via the base station controller 20. Although the wireless communication system 10 is shown employing antennas to transmit RF signals, one skilled in the art should recognize that communications may be accomplished via microwave or satellite uplinks. Additionally, the functions of a base station 14 may be combined with the base station controller 20 to form a master base station. The location of where these base station controller functions are performed is not central to the present invention.

Figure 4:
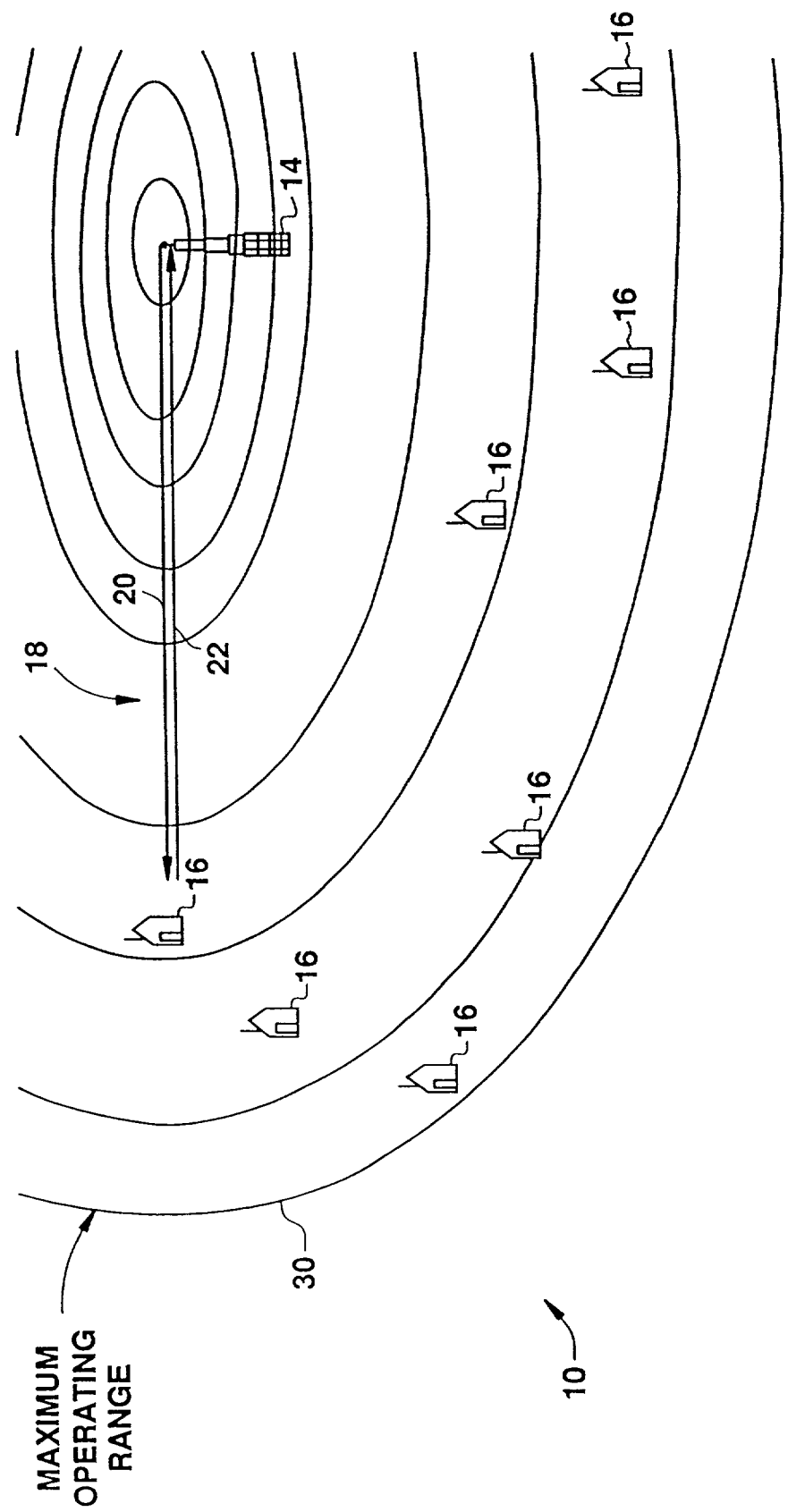
FIG. 4 is a diagram showing the propagation of signals between a base station and a plurality of subscriber units.

Referring to FIG. 4, the propagation of certain signals in the establishment of a communication channel 18 between a base station 14 and a plurality of subscriber units 16 is shown. The forward pilot signal 20 is transmitted from the base station 14 at time t0, and is received by a subscriber unit 16 after a propagation delay $\Delta t$. To be acquired by the base station 14 the subscriber unit 16 transmits an access signal 22 which is received by the base station 14 after a further propagation delay of $\Delta t$. Accordingly, the round trip propagation delay is $2\Delta t$. The access signal 22 is transmitted epoch aligned to the forward pilot signal 20, which means that the code phase of the access signal 22 when transmitted is identical to the code phase of the received forward pilot signal 20.

The round trip propagation delay depends upon the location of a subscriber unit 16 with respect to the base station 14. Communication signals transmitted between a subscriber unit 16 located closer to the base station 14 will experience a shorter propagation delay than a subscriber unit 16 located further from the base station 14. Since the base station 14 must be able to acquire subscriber units 16 located at any position within the cell 30, the base station 14 must search all code phases of the access signal corresponding to the entire range of propagation delays of the cell 30.

It should be apparent to those of skill in the art that the establishment of a communication channel between a base station 14 and a subscriber unit 16 is a complex procedure involving many tasks performed by the base station 14 and the subscriber unit 16 which are outside the scope of the present invention. The present invention is directed to decreasing the reacquisition time of a fixed subscriber unit 16 by a base station 14 during the re-establishment of a communication channel.

Figure 5:
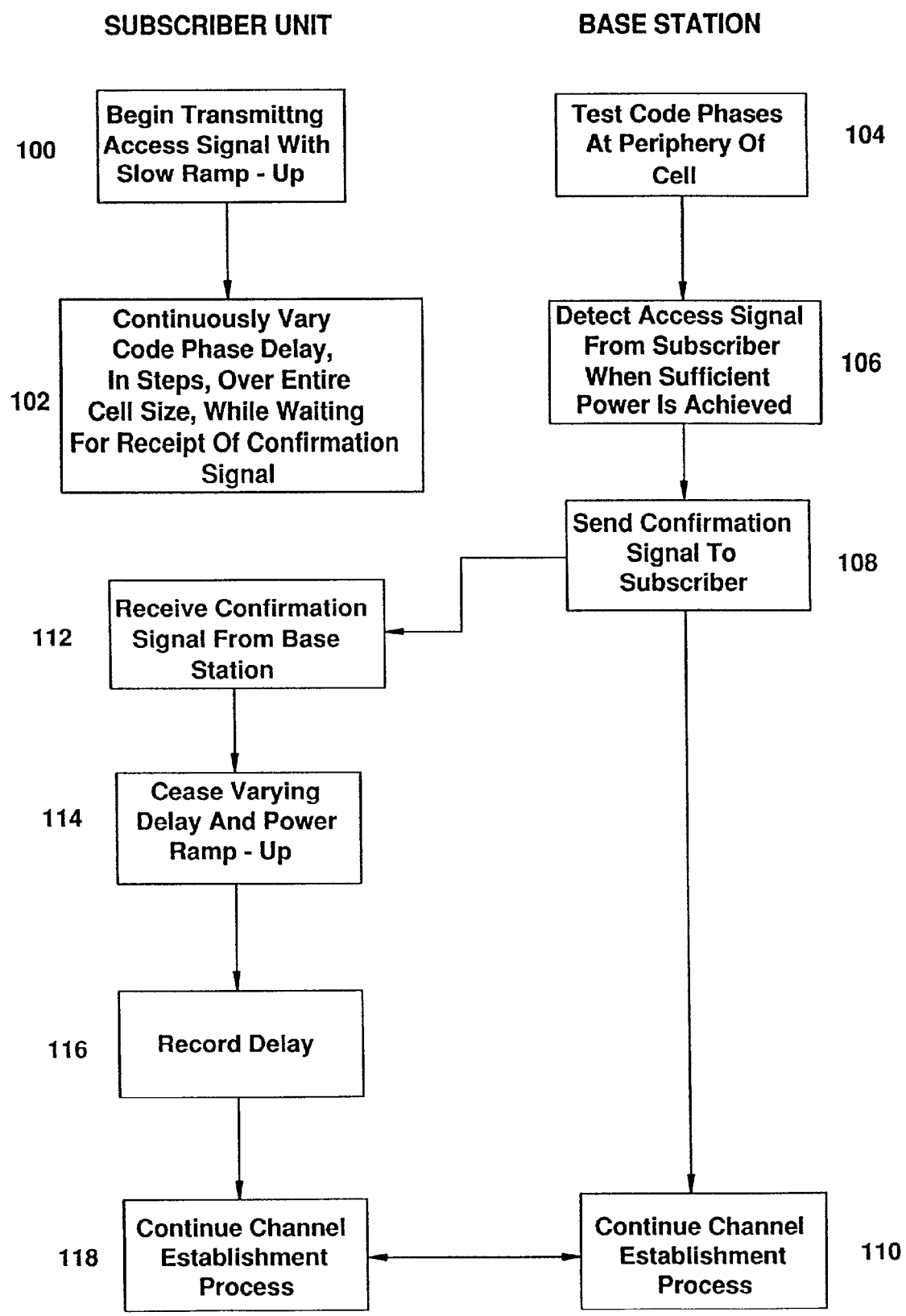
FIG. 5 is a flow diagram of the preferred embodiment of the initial establishment of a communication channel between a base station and a subscriber unit using slow initial acquisition.

Referring to FIG. 5, the tasks associated with initial acquisition of a subscriber unit 16 by a base station 14 in accordance with the preferred embodiment of the present invention are shown. When a subscriber unit 16 desires the establishment of a channel 18 with a base station 14 with which it has never established a channel, the subscriber unit 16 has no knowledge of the two-way propagation delay. Accordingly, the subscriber unit 16 enters the initial acquisition channel establishment process.

The subscriber unit 16 selects a low initial power level and zero code phase delay, (epoch aligning the code phase of the transmitted access signal 22 to the code phase of the received forward pilot signal 20), and commences transmitting the access signal 22 while slowly (0.05–0.1 dB/msec) ramping-up transmission power (step 100). While the subscriber unit 16 is awaiting receipt of the confirmation signal from the base station 14, it varies the code phase delay in predetermined steps from zero to the delay corresponding to the periphery of the cell 30, (the maximum code phase delay), allowing sufficient time between steps for the base station 14 to detect the access signal 22 (step 102). If the subscriber unit 16 reaches the code phase delay corresponding to the periphery of the cell 30, it repeats the process of varying the code phase delay while continuing the slow power ramp-up (step 102).

In order to acquire subscriber units 16 desiring access, the base station 14 continuously transmits a forward pilot signal 20 and attempts to detect the access signals 22 from subscriber units 16 (step 104). Rather than test for access signals 22 at all code phase delays within the cell 30 as with current systems, the base station 14 need only test code phase delays centered about the periphery of the cell 30.

The base station 14 detects the access signal 22 (step 106) when the subscriber unit 16 begins transmitting with sufficient power at the code phase delay which makes the subscriber unit 16 appear to be at the periphery of the cell 30, thereby "virtually" locating the subscriber unit 16 at the periphery of the cell 30. The base station 14 then transmits a signal to the subscriber unit 16 which confirms that the access signal 22 has been received (step 108) and continues with the channel establishment process (step 110).

Once the subscriber unit 16 receives the confirmation signal (step 112), it ceases the ramp-up of transmission power, ceases varying the code phase delay (step 114) and records the value of the code phase delay for subsequent re-acquisitions (step 116). The subscriber unit 16 then continues the channel establishment process including closed-loop power transmission control (step 118).

Figure 6:
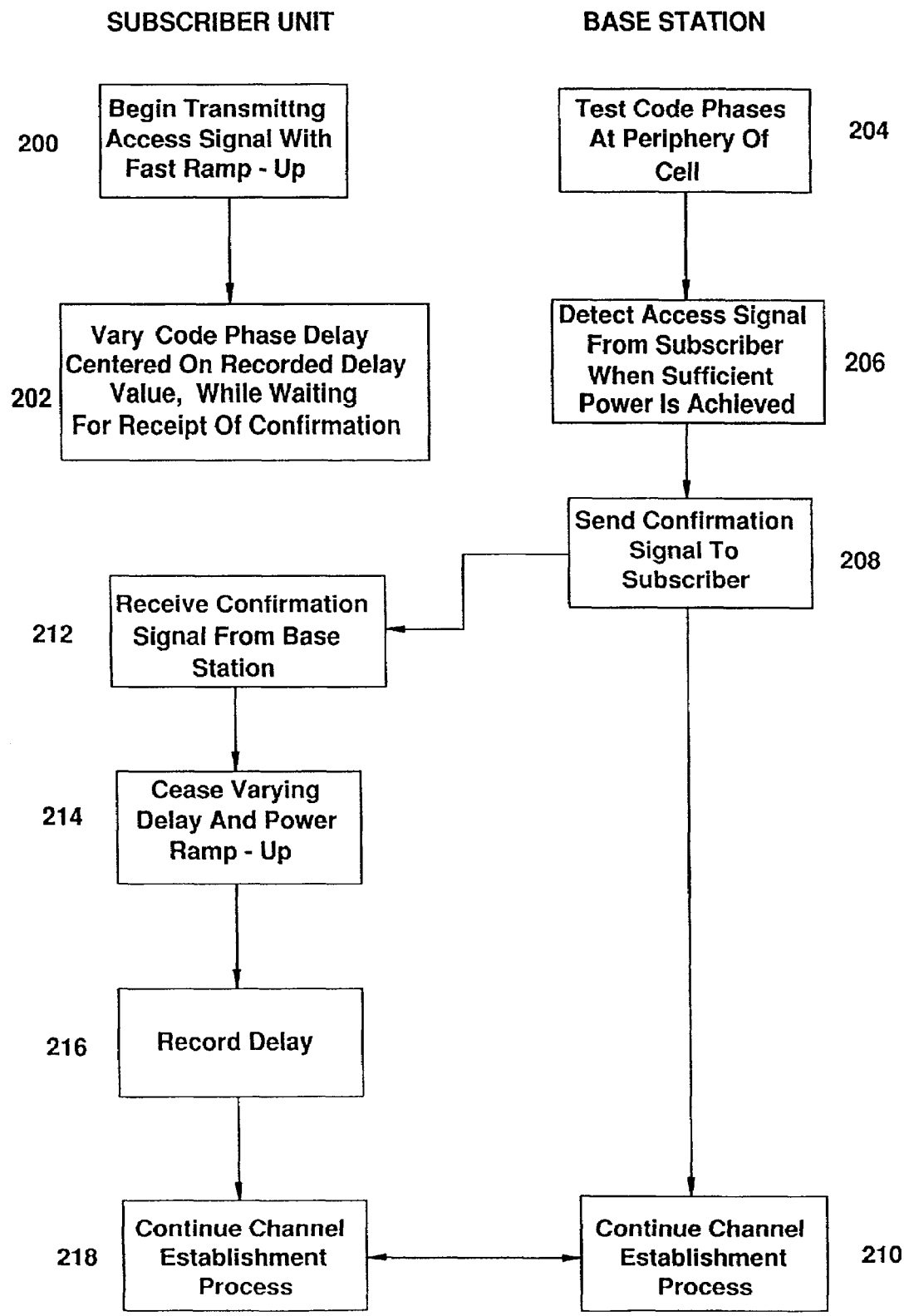
FIG. 6 is a flow diagram of the preferred embodiment of the reestablishment of a communication channel between a base station and a subscriber unit using fast re-acquisition.

On subsequent re-acquisitions when a subscriber unit 16 desires the establishment of a channel 18 with a base station 14, the subscriber unit 16 enters the re-acquisition channel establishment process shown in FIG. 6. The subscriber unit 16 selects a low initial power level and the code phase delay recorded during the initial acquisition process, (shown in FIG. 5), and commences continuously transmitting the access signal 22 while quickly (1 dB/msec) ramping-up transmission power (step 200). While the subscriber unit 16 is awaiting receipt of the confirmation signal from the base station 14, it slightly varies the code phase delay of the access signal 22 about the recorded code phase delay, allowing sufficient time for the base station 14 to detect the access signal 22 before changing the delay (step 202). The base station 14 as in FIG. 5, transmits a forward pilot signal 20 and tests only the code phase delays at the periphery of the cell 30 in attempting to acquire the subscriber units 16 within its operating range (step 204). The base station 14 detects the access signal 22 when the subscriber unit 16 transmits with sufficient power at the code phase delay which makes the subscriber unit 16 appear to be at the periphery of the cell 30 (step 206). The base station 14 transmits a signal to the subscriber unit 16 which confirms that the access signal 22 has been received (step 208) and continues with the channel establishment process (step 210).

When the subscriber unit 16 receives the confirmation signal (step 212) it ceases power ramp-up, ceases varying the code phase delay (step 214) and records the present value of the code phase delay for subsequent re-acquisitions (step 216). This code phase delay may be slightly different from the code phase delay initially used when starting the re-acquisitions process (step 202). The subscriber unit 16 then continues the channel establishment process at the present power level (step 218). If a subscriber unit 16 has not received a confirmation signal from the base station 14 after a predetermined time, the subscriber unit 16 reverts to the initial acquisition process described in FIG. 5.

The effect of introducing a code phase delay in the Tx 20 and Rx 22 communications between the base station 14 and a subscriber unit 16 will be explained with reference to FIGS. 7A and 7B. Referring to FIG. 7A, a base station 160 communicates with two subscriber units 162, 164. The first subscriber unit 162 is located 30 km from the base station 160 at the maximum operating range. The second subscriber unit 164 is located 15 km from the base station 160. The propagation delay of Tx and Rx communications between the first subscriber unit 162 and the base station 160 will be twice that of communications between the second subscriber unit 164 and the base station 160.

Referring to FIG. 7B, after an added delay value 166 is introduced into the Tx PN generator of the second subscriber unit 164 the propagation delay of communications between the first subscriber unit 162 and the base station 160 will be the same as the propagation delay of communications between the second subscriber unit 164 and the base station 160. Viewed from the base station 160, it appears as though the second subscriber unit 164 is located at the virtual range 164'.

Figure 8:
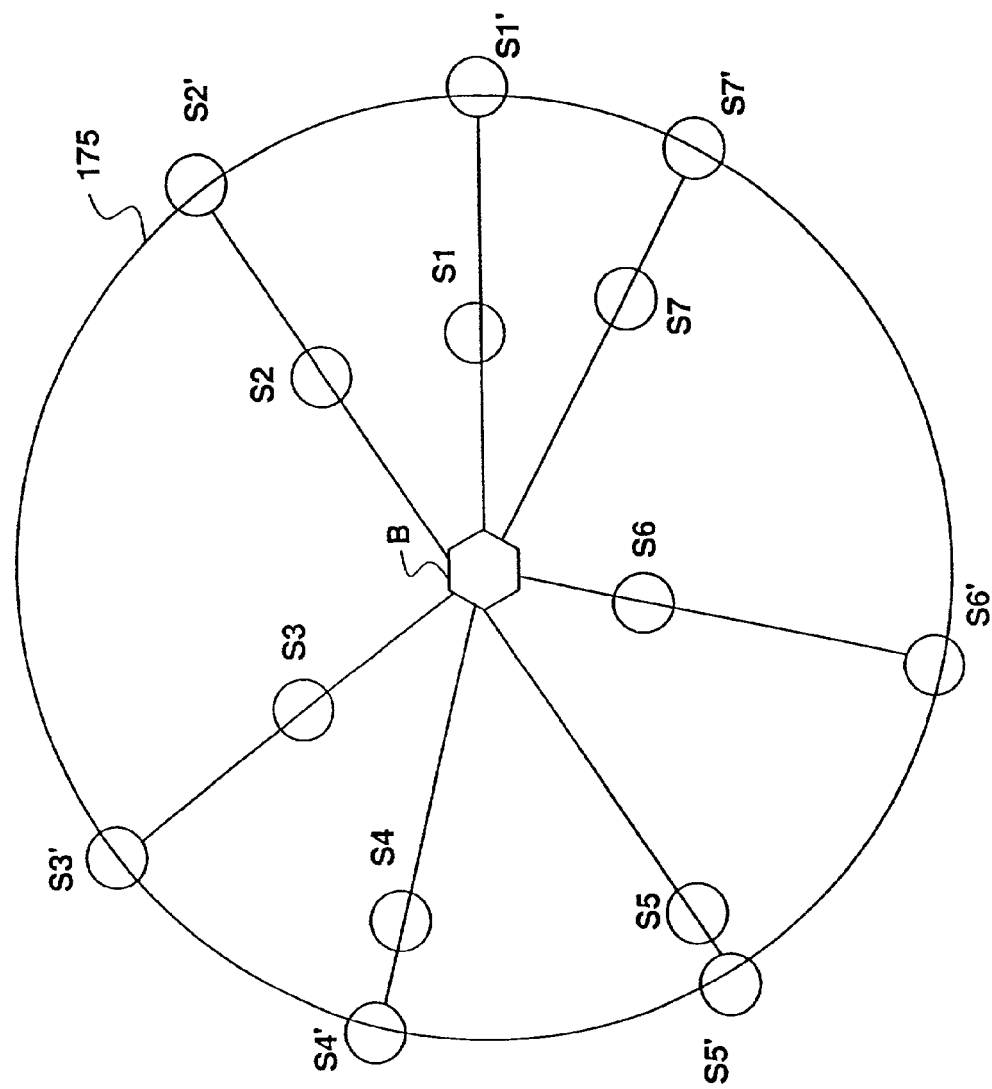
FIG. 8 is a schematic overview of a plurality of subscriber units which have been virtually located.

Referring to FIG. 8, it can be seen that when a plurality of subscriber units S1–S7 are virtually relocated S1'–S7' to the virtual range 175, the base station must only test the code phase delays centered about the virtual range 175.

Utilizing the present invention, a subscriber unit 16 which has achieved a sufficient power level will be acquired by the base station 14 in approximately 2 msec. Due to the shorter acquisition time, the subscriber unit 16 can ramp-up at a much faster rate, (on the order of 1 dB/msec), without significantly overshooting the desired power level. Assuming the same 20 dB power back-off, it would take the subscriber unit 16 approximately 20 msec to reach the sufficient power level for detection by the base station 14. Accordingly, the entire duration of the re-acquisition process of the present invention is approximately 22 msec, which is an order of magnitude reduction from prior art reacquisition methods.

Figure 9:
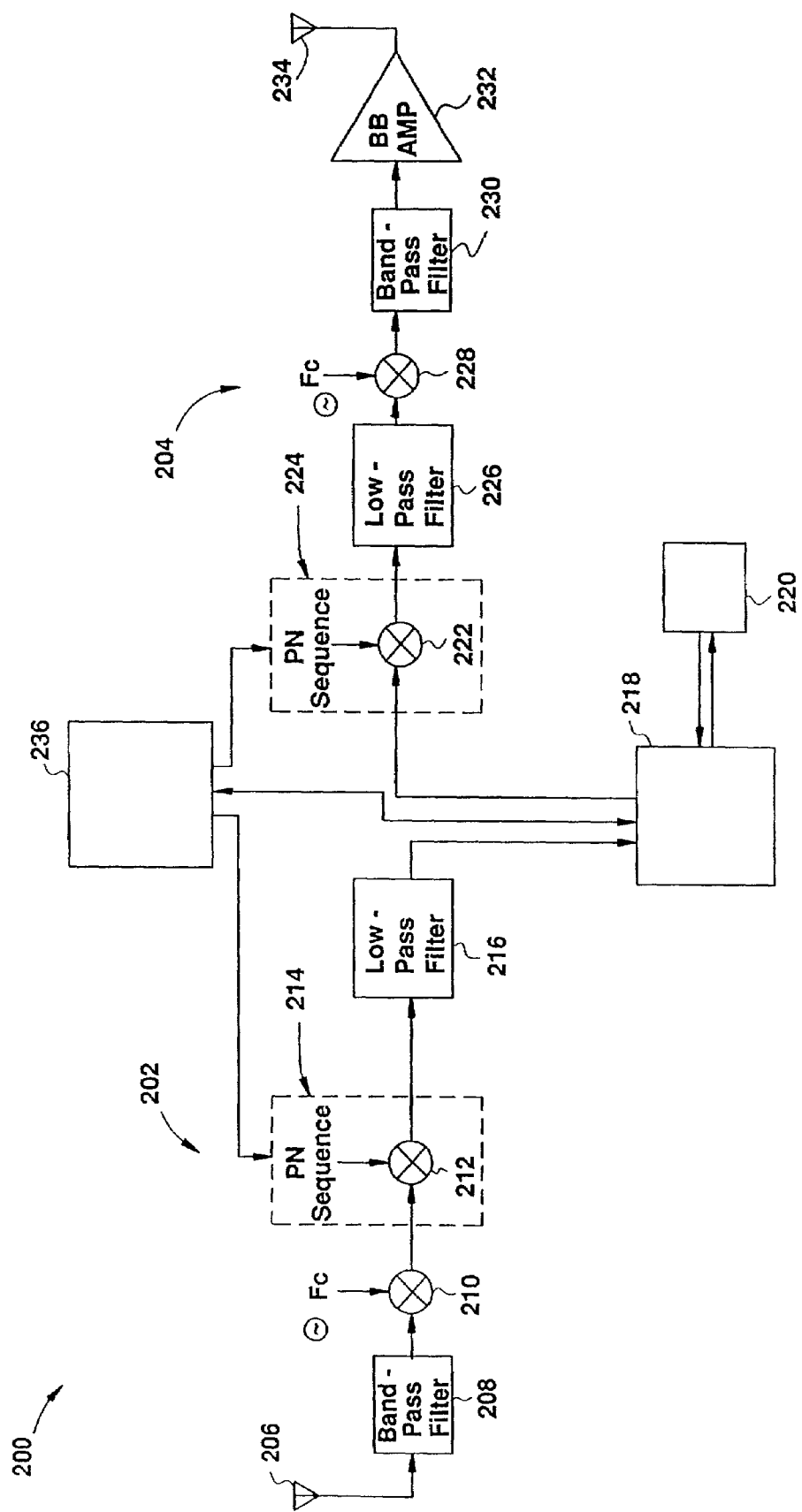
FIG. 9 is a subscriber unit made in accordance with the teachings of the present invention.

A subscriber unit 200 made in accordance with the present invention is shown in FIG. 9. The subscriber unit 200 includes a receiver section 202 and a transmitter section 204. An antenna 206 receives a signal from the base station 14, which is filtered by a band-pass filter 208 having a bandwidth equal to twice the chip rate and a center frequency equal to the center frequency of the spread spectrum system's bandwidth. The output of the filter 208 is down-converted by a mixer 210 to a baseband signal using a constant frequency (Fc) local oscillator. The output of the mixer 210 is then spread spectrum decoded by applying a PN sequence to a mixer 212 within the PN Rx generator 214. The output of the mixer 212 is applied to a low pass filter 216 having a cutoff frequency at the data rate (Fb) of the PCM data sequence. The output of the filter 216 is input to a codec 218 which interfaces with the communicating entity 220.

A baseband signal from the communicating entity 220 is pulse code modulated by the codec 218. Preferably, a 32 kilobit per second adaptive pulse code modulation (AD-PCM) is used. The PCM signal is applied to a mixer 222 within a PN Tx generator 224. The mixer 222 multiplies the PCM data signal with the PN sequence. The output of the mixer 222 is applied to low-pass filter 226 whose cutoff frequency is equal to the system chip rate. The output of the filter 226 is then applied to a mixer 228 and suitably up-converted, as determined by the carrier frequency Fc applied to the other terminal. The up-converted signal is then passed through a band-pass filter 230 and to a broadband RF amplifier 232 which drives an antenna 234.

The microprocessor 236 controls the acquisition process as well as the Rx and Tx PN generators 214, 224. The microprocessor 236 controls the code phase delay added to the Rx and Tx PN generators 214, 224 to acquire the forward pilot signal 20, and for the subscriber unit 200 to be acquired by the base station 14, and records the code phase difference between these PN generators. For re-acquisition the microprocessor 236 adds the recorded delay to the Tx PN generator 224.

The base station 14 uses a configuration similar to the subscriber unit 16 to detect PN coded signals from the subscriber unit 200. The microprocessor (not shown) in the base station 14 controls the Rx PN generator in a similar manner to make the code phase difference between Rx PN generator and the Tx PN generator equivalent to the two-way propagation delay of the subscriber unit's 16 virtual location. Once the base station 14 acquires the access signal 22 from the subscriber unit 16, all other signals from the subscriber unit 16 to the base station 14 (traffic, pilot, etc.) use the same code phase delay determined during the acquisition process.

It should be noted that although the invention has been described herein as the virtual locating of subscriber units 16 at the periphery of the cell 30 the virtual location can be at any fixed distance from the base station 14.

Figure 10:
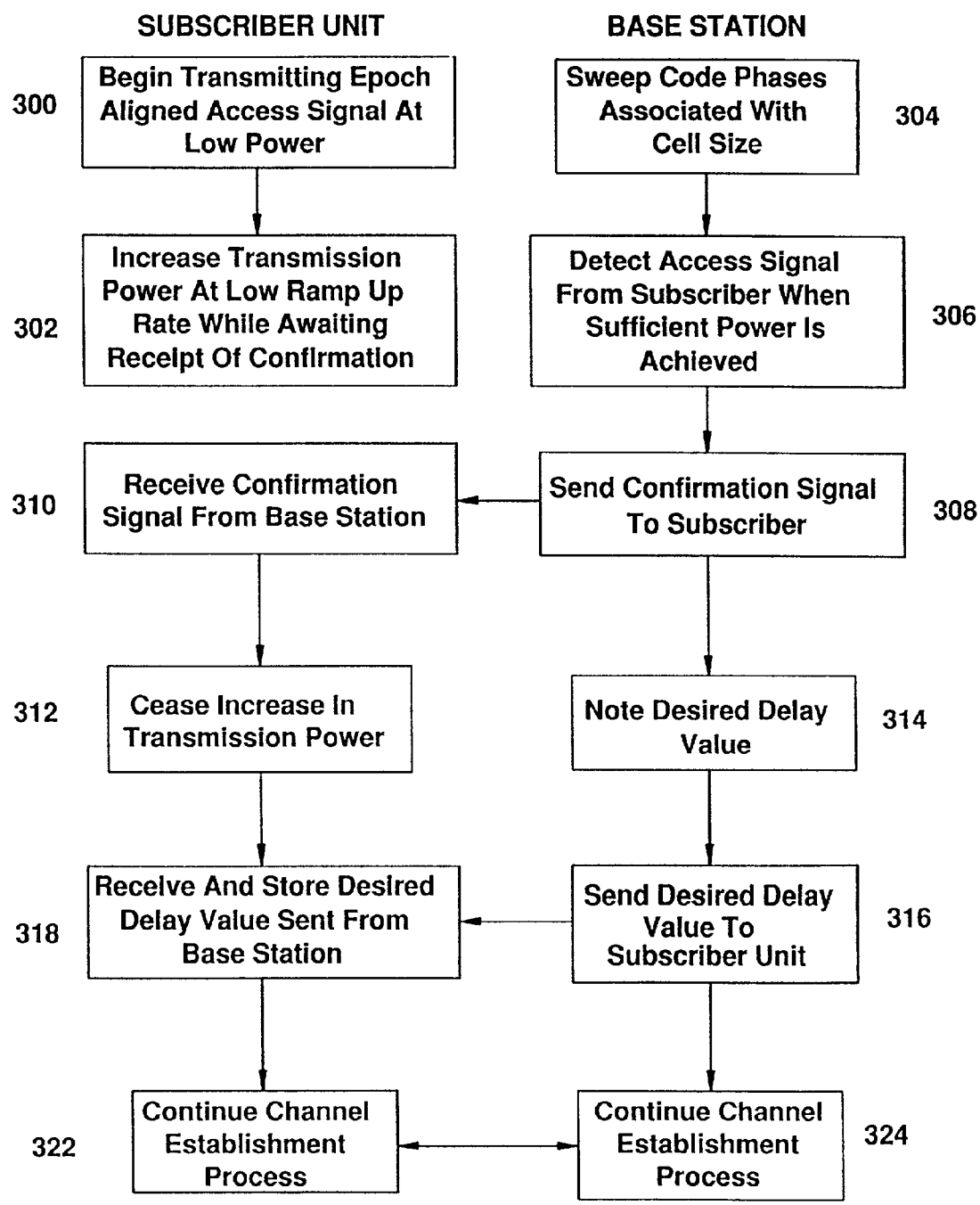
FIG. 10 is a flow diagram of an alternative embodiment of the initial establishment of a communication channel between a base station and a subscriber unit using slow initial acquisition.

Referring to FIG. 10, the tasks associated with initial acquisition of a "never-acquired" subscriber unit 16 by a base station 14 in accordance with an alternative embodiment of the present invention are shown. The subscriber unit 16 continuously transmits an epoch aligned access signal 22 to the base station 14 (step 300) when the establishment of a channel 18 is desired. While the subscriber unit 16 is awaiting the receipt of a confirmation signal from the base station 14, it continuously increases the transmission power as it continues transmission of the access signal 22 (step 302).

To detect subscriber units which have never been acquired, the base station 14 transmits a forward pilot signal 20 and sweeps the cell by searching all code phases corresponding to the entire range of propagation delays of the cell (step 304) and detects the epoch aligned access signal 22 sent from the subscriber unit 16 after the transmission has achieved sufficient power for detection (step 306). The base station 14 transmits a signal to the subscriber unit 16 (step 308) which confirms that the access signal 22 has been received. The subscriber unit 16 receives the confirmation signal (step 310) and ceases the increase in transmission power (step 312).

The base station 14 determines the desired code phase delay of the subscriber unit 16 by noting the difference between the Tx and Rx PN generators 224, 214 after acquiring the subscriber unit 16. The desired code phase delay value is sent to the subscriber unit 16 (step 316) as an OA&M message, which receives and stores the value (step 318) for use during re-acquisition, and continues with the channel establishment process (steps 322 and 324).

Figure 11:
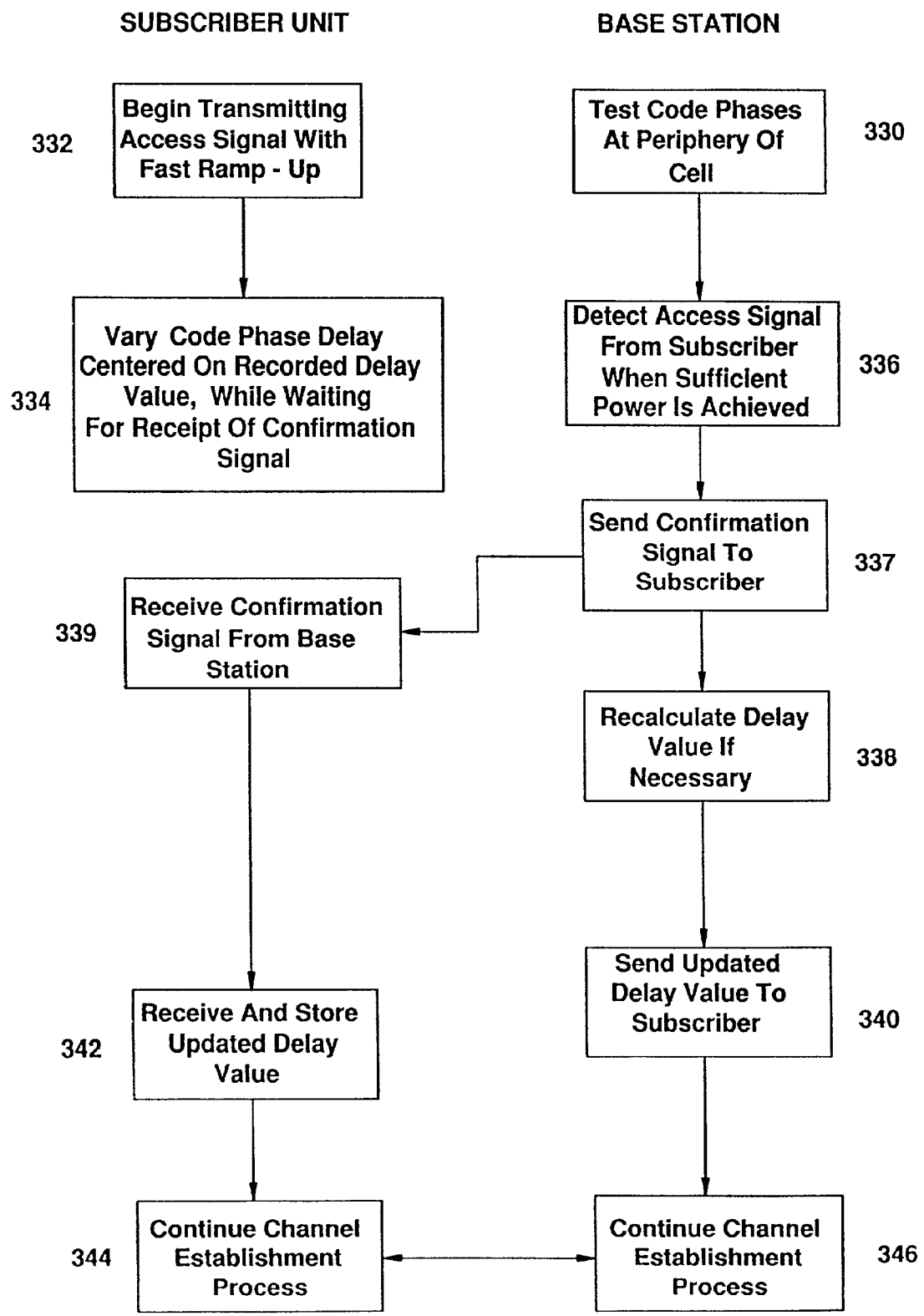
FIG. 11 is a flow diagram of an alternative embodiment of the reestablishment of a communication channel between a base station and a subscriber unit using fast re-acquisition.

Referring to FIG. 11, an alternative method of fast reacquisition in accordance with the present invention is shown. When a communication channel must be reestablished between the subscriber unit 16 and the base station 14, the subscriber unit 16 transmits the access signal 22 with the desired code phase delay as in the preferred embodiment.

With all of the previously acquired subscriber units 16 at the same virtual range, the base station 14 need only search the code phase delays centered about the periphery of the cell to acquire the access signals 22 of such subscriber units 16 (step 330). Thus, a subscriber unit 16 may ramp-up power rapidly to exploit the more frequent acquisition opportunities. The subscriber unit 16 implements the delay the same way as in the preferred embodiment. The base station 14 subsequently detects the subscriber unit 16 at the periphery of the cell (step 336), sends a confirmation signal to the subscriber unit (step 337) and recalculates the desired code phase delay value, if necessary. Recalculation (step 338) compensates for propagation path changes, oscillator drift and other communication variables. The base station 14 sends the updated desired code phase delay value to the subscriber unit 16 (step 340) which receives and stores the updated value (step 342). The subscriber unit 16 and the base station 14 then continue the channel establishment process communications (steps 344 and 346).

Note that the alternative embodiment requires the base station to search both the code phase delays centered on the periphery of the cell to re-acquire previously acquired subscriber units and the code phase delays for the entire cell to acquired subscriber units which have never been acquired.

Figure 12:
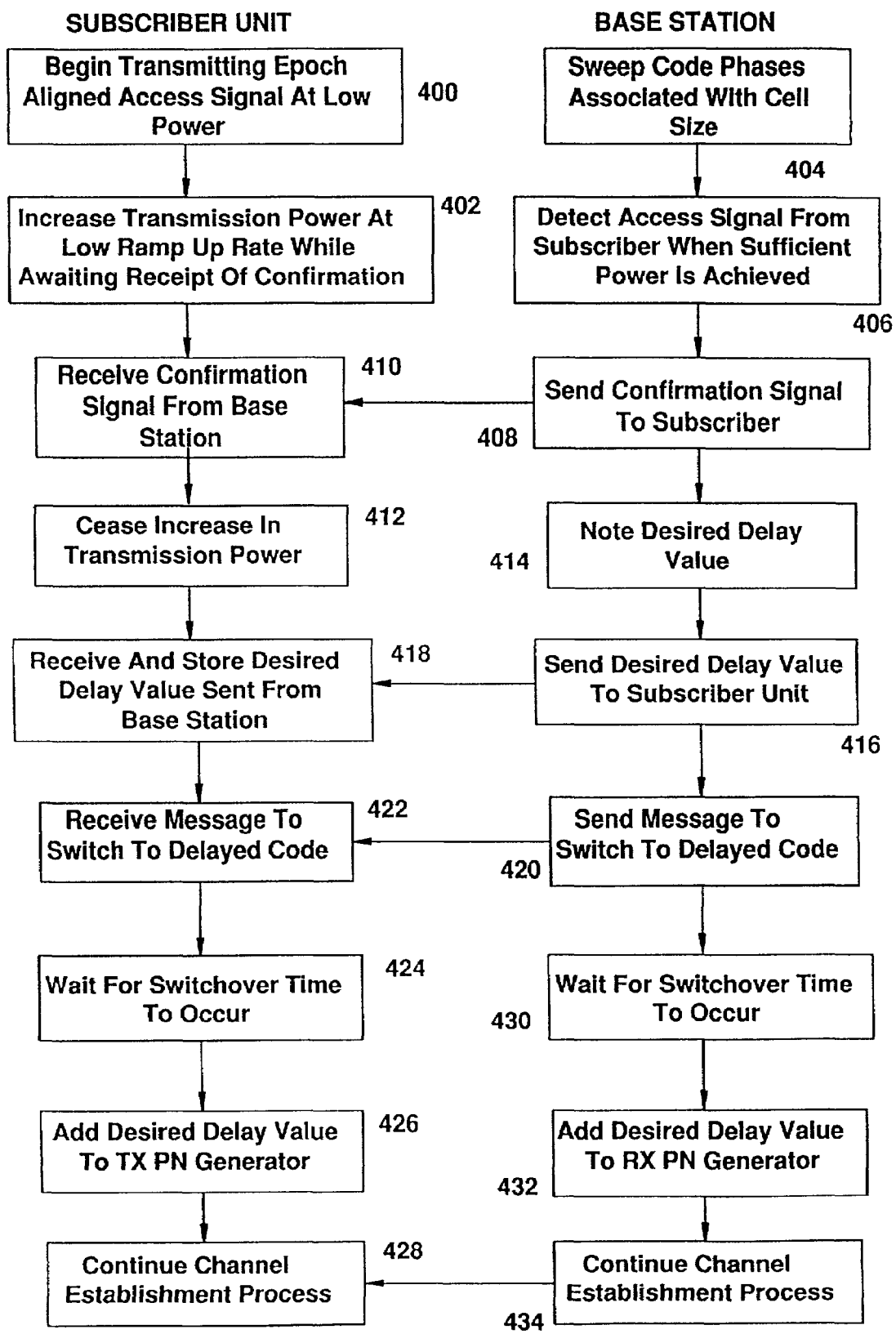
FIG. 12 is a flow diagram of a second alternative embodiment of the initial establishment of a communication channel between a base station and a subscriber unit using slow initial acquisition.

Referring to FIG. 12, the tasks associated with initial acquisition of a never-acquired subscriber unit 16 by a base station 14 in accordance with a second alternative embodiment of the present invention are shown. In the embodiment shown in FIG. 10, when a never-acquired subscriber unit 16 is acquired the access signal 20 remains epoch aligned to the forward pilot signal 20. In this embodiment, the base station 14 and subscriber unit 16 change the code phase alignment of the access signal 22 from epoch aligned to delayed, (by the code phase delay), to make the subscriber unit 16 appear at the periphery of the cell. This change is performed at a designated time.

Steps 400 through 418 are the same as the corresponding steps 300 through 318 shown in FIG. 10. However, after the base station 14 sends the desired delay value to the subscriber unit 16 (step 416) the base station 14 sends a message to the subscriber unit 16 to switch to the desired delay value at a time referenced to a sub-epoch of the forward pilot signal 20 (step 420). The subscriber unit 16 receives this message (step 422), and both units 14, 16 wait until the switchover time is reached (steps 424, 430). At that time, the base station 14 adds the desired delay value to its Rx PN operator (step 432) and the subscriber unit 16 adds the same desired delay value to its Tx PN generator (step 426). The subscriber unit 16 and the base station 14 then continue the channel establishment process communication (step 428, 434).

Although the invention has been described in part by making detailed reference to the preferred and alternative embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A method for communicating between a base station and at least one subscriber unit; comprising:
   receiving at said subscriber unit a pilot signal from said base station;
   generating at said subscriber unit an access signal, and epoch aligning the access signal to said received pilot signal;
   transmitting said epoch-aligned access signal from said subscriber unit to said base station;
   receiving a confirmation signal at said subscriber unit in response to the transmission of said epoch-aligned access signal;
   determining a timing difference value at the subscriber unit between said access signal and said confirmation signal; and
   storing said difference value.

2. A method for communicating between a base station and at least one subscriber unit; comprising:
   transmitting a pilot signal from said base station;
   receiving said pilot signal at said subscriber unit;
   generating at said subscriber unit, in response to said pilot signal, an access signal;
   epoch aligning said access signal to said pilot signal;
   transmitting said epoch-aligned access signal from said subscriber unit to said base station;
   receiving said epoch-aligned access signal at said base station;
   generating a confirmation signal at said base station in response to said received epoch-aligned access signal;
   transmitting said confirmation signal from said base station to said subscriber unit;
   receiving said confirmation signal at said subscriber unit;
   determining a difference value at said subscriber unit between the transmission of said access signal and the receipt of said confirmation signal; and
   storing said difference value.

3. A method for communicating between a base station and at least one subscriber unit; comprising:
   transmitting a reference signal from the base station;
   receiving the reference signal at the subscriber unit;
   determining the epoch of said reference signal;
   generating at the subscriber unit an epoch-aligned access signal in response to the receipt of the reference signal;
   transmitting the epoch-aligned access signal from the subscriber unit to the base station;
   receiving at the base station the epoch-aligned access signal from the subscriber unit;
   generating an epoch-aligned confirmation signal at the base station;
   transmitting the epoch-aligned confirmation signal from the base station to the subscriber unit;
   receiving the epoch-aligned confirmation signal at the subscriber unit;
   determining a difference value at the subscriber unit between the transmission of the epoch-aligned access signal at the subscriber unit and the receipt of the epoch-aligned confirmation signal at the subscriber unit; and
   storing the difference value at the subscriber unit.

4. A method for communicating between a base station and at least one subscriber unit; comprising:
   transmitting a pilot signal from the base station;
   receiving the pilot signal at the subscriber unit;
   determining the epoch of the pilot signal;
   generating at the subscriber unit an epoch-aligned access signal in response to the receipt of the pilot signal;
   transmitting the epoch-aligned access signal from the subscriber unit to the base station;
   receiving at the base station the epoch-aligned access signal from the subscriber unit;
   generating an epoch-aligned confirmation signal at the base station;
   transmitting the epoch-aligned confirmation signal from the base station to the subscriber unit;
   receiving the epoch-aligned confirmation signal at the subscriber unit;
   determining a difference value at the subscriber unit between the transmission of the epoch-aligned access signal at the subscriber unit and the receipt of the epoch-aligned confirmation signal at the subscriber unit; and
   storing the difference value at the subscriber unit.

5. A method for communicating between a base station and at least one subscriber unit; comprising:
   transmitting a pilot signal from the base station;
   searching for said pilot signal, at the subscriber unit, within a first code phase delay range;
   acquiring said pilot signal at the subscriber unit within said first code phase delay range;
   generating, at the subscriber unit, an access signal and epoch aligning the access signal to said pilot signal;
   transmitting the epoch-aligned access signal from the subscriber unit to the base station;
   receiving the epoch-aligned access signal at said base station;
   generating, at the base station, in response to the receipt of said epoch-aligned access signal, a confirmation signal;
   transmitting said confirmation signal from the base station to the subscriber unit;
   receiving said transmitted confirmation signal at the subscriber unit;
   determining a timing difference value at the subscriber unit between the transmission of said access signal from the subscriber unit and the receipt of said confirmation signal at the subscriber unit; and
   storing said difference value.

6. The method of claim 5, further including increasing the power level of said access signal until said confirmation signal is received from the base station.

7. The method of claim 6 further including ceasing the increase in transmission power level from the subscriber unit when said conformation signal is received.

8. The method of claim 7 wherein the power level is selectively increased.

9. The method of claim 8 further including determining, at the base station, the duration between the transmission of a communication sent to the subscriber unit and the receipt of a responding communication from the subscriber.

10. The method of claim 9 wherein said step of determining further includes calculating the timing difference between said determined duration and a desired duration.

11. The method of claim 10 further including transmitting, from said base station, a timing signal to the subscriber unit based upon said calculated timing difference.

12. The method of claim 11 further including receiving, at the subscriber unit, said timing signal and delaying signals transmitted from the subscriber unit by said calculated timing difference.

13. A method for establishing an initial communication between a base station and at least one subscriber unit; comprising:
   transmitting a pilot signal from the base station;
   searching for said pilot signal, at said subscriber unit, within a first code phase delay range;
   acquiring said pilot signal at said subscriber unit within said first code phase delay change;
   generating at said subscriber unit an access signal and epoch aligning the access signal to said pilot signal;
   transmitting the epoch-aligned access signal from said subscriber unit to said base station while continually increasing the transmission power of said epoch-aligned access signal at a first rate;
   receiving said epoch-aligned access signal at said base station;
   generating at said base station, in response to the receipt of said epoch-aligned access signal, a confirmation signal;
   transmitting said confirmation signal from said base station to said subscriber unit;
   receiving said transmitted confirmation signal at said subscriber unit;
   ceasing the increase in transmission power of said epoch-aligned access signal when said confirmation signal is received;
   determining a timing difference value at said subscriber unit between the transmission of said access signal from said subscriber unit and the receipt of said confirmation signal at said subscriber unit; and
   storing said difference value.

14. The method of claim 13 further comprising establishing a subsequent communication between said base station and said subscriber unit comprising:
   searching for said pilot signal within a second code phase delay range, said second code delay range being based upon said stored difference value; and
   acquiring said pilot signal at said subscriber unit within said second code phase delay range.

15. The method of claim 14 further comprising generating at said subscriber unit a second access signal and epoch aligning the second access signal to said pilot signal;
   transmitting said second epoch-aligned access signal from said subscriber unit to said base station while continually increasing the transmission power of said second epoch-aligned access signal at a second rate.

16. The method of claim 15 whereby said second rate is greater than said first rate.

17. The method of claim 15 whereby said second code phase delay range is smaller than said first code phase delay range.

18. A method for communicating between a base station and at least one subscriber unit; comprising:
   transmitting a pilot signal from the base station;
   searching for said pilot signal within a first code phase delay range;
   acquiring the pilot signal at the subscriber unit within the first code phase delay range;
   generating at the subscriber unit an access signal and epoch aligning the access signal to the pilot signal;
   transmitting the epoch-aligned access signal from the subscriber unit, to the base station at an initial power level while continually increasing the transmission power of the epoch-aligned access signal at a first rate;
   receiving the epoch-aligned access signal at the base station;
   generating, at the base station, in response to the receipt of the epoch-aligned access signal, a confirmation signal;
   transmitting the confirmation signal from the base station to the subscriber unit;
   ceasing the increase of the power level upon the receipt of the confirmation signal;
   determining a difference value at the subscriber unit between the transmission of the access signal from the subscriber unit and the receipt of the confirmation signal at the subscriber unit; and
   storing the difference value.

19. The method of claim 18, further including storing the value of the power level when the increase is ceased.

* * * * *

UNITED STATES PATENT AND TRADEMARK OFFICE
CERTIFICATE OF CORRECTION

PATENT NO. : 6,980,538 B2
APPLICATION NO. : 09/880977
DATED : December 27, 2005
INVENTOR(S) : John W. Haim It is certified that error appears in the above-identified patent and that said Letters Patent is hereby corrected as shown below:

ON THE TITLE PAGE

At Item (54), line 3, delete "REACQUISITION TIME" and insert

--RE-ACQUISITION TIME--

IN THE SPECIFICATION

At column 1, line 3, delete "REACQUISITION TIME", and insert therefor

--RE-ACQUISITION TIME--.

At column 1, line 52, before the word "simultaneous", delete "the".

At column 2, line 19, after the word "subscriber", insert --unit--.

At column 8, line 50, after the word "to", delete "acquired" and insert therefor --acquire--.

At column 8, line 56, after the word "acquired", insert --,--.

IN THE CLAIMS

In claim 9, column 11, line 4, after the word "subscriber", insert --unit--.

UNITED STATES PATENT AND TRADEMARK OFFICE
CERTIFICATE OF CORRECTION

PATENT NO. : 6,980,538 B2
APPLICATION NO. : 09/880977
DATED : December 27, 2005
INVENTOR(S) : John W. Haim It is certified that error appears in the above-identified patent and that said Letters Patent is hereby corrected as shown below:

In claim 13, column 11, line 22, after the word "delay", delete "change" and insert therefor --range--.

Signed and Sealed this

Twenty-sixth Day of December, 2006

JON W. DUDAS
*Director of the United States Patent and Trademark Office*